US008259752B2

(12) United States Patent
Terry et al.

(10) Patent No.: US 8,259,752 B2
(45) Date of Patent: Sep. 4, 2012

(54) MEDIUM ACCESS CONTROL LAYER ARCHITECTURE FOR SUPPORTING ENHANCED UPLINK

(75) Inventors: Stephen E. Terry, Northport, NY (US); Guodong Zhang, Farmingdale, NY (US); Stephen G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 664 days.

(21) Appl. No.: 11/117,626

(22) Filed: Apr. 28, 2005

(65) Prior Publication Data

US 2005/0249133 A1 Nov. 10, 2005

Related U.S. Application Data

(60) Provisional application No. 60/568,944, filed on May 7, 2004, provisional application No. 60/578,533, filed on Jun. 10, 2004.

(51) Int. Cl.
*H04J 3/16* (2006.01)

(52) U.S. Cl. ........ 370/469; 370/328; 370/338; 370/477; 455/450

(58) Field of Classification Search .......... 370/252–253, 370/278, 328–329, 335, 338, 342, 469, 477, 370/431, 208, 230, 235, 352, 401, 429; 455/426.2, 455/554.2, 450, 458
See application file for complete search history.

(56) References Cited

U.S. PATENT DOCUMENTS 6,526,030 B2 2/2003 Rezaiifar et al.
6,661,777 B1 12/2003 Blanc et al.
6,678,249 B2 1/2004 Toskala et al.
6,731,623 B2 5/2004 Lee et al.
7,239,870 B2 * 7/2007 Zhang et al. ............... 455/422.1
2002/0181436 A1 * 12/2002 Mueckenheim et al. ..... 370/349
2002/0196760 A1 * 12/2002 Malomsoky et al. ......... 370/338
2003/0123415 A1 7/2003 Bysted et al.
2003/0153323 A1 * 8/2003 Hwang ......................... 455/450
2003/0156546 A1 8/2003 Demetrescu et al.

(Continued)

FOREIGN PATENT DOCUMENTS

EP 1 257 140 11/2002

(Continued)

OTHER PUBLICATIONS

3GPP2 C.S0002-C, "Physical Layer Standard for cdma2000 Spread Spectrum Systems", 3rd Generation Partnership Project 2 "3GPP2", Version 2.0, Revision C, Jul. 23, 2004.

(Continued)

*Primary Examiner* — George Eng
*Assistant Examiner* — Inder Mehra
(74) *Attorney, Agent, or Firm* — Volpe and Koenig, P.C.

(57) ABSTRACT

A medium access control (MAC) layer architecture and functionality for supporting enhanced uplink (EU). A MAC entity for EU, (i.e., a MAC-e entity), is incorporated into a wireless transmit/receive unit (WTRU), a Node-B and a radio network controller (RNC). The WTRU MAC-e handles hybrid-automatic repeat request (H-ARQ) transmissions and retransmissions, priority handling, MAC-e multiplexing, and transport format combination (TFC) selection. The Node-B MAC-e entity handles H-ARQ transmissions and retransmissions, E-DCH scheduling and MAC-e de-multiplexing. The RNC MAC-e entity provides in-sequence delivery and handles combining of data from different Node-Bs.

20 Claims, 2 Drawing Sheets

U.S. PATENT DOCUMENTS

2003/0202485 A1 10/2003 Mansfield
2004/0008659 A1 1/2004 Kim
2004/0100982 A1* 5/2004 Balasubramanian ......... 370/429
2004/0131106 A1* 7/2004 Kanterakis .................... 375/141
2004/0228313 A1* 11/2004 Cheng et al. .................. 370/342
2004/0233899 A1* 11/2004 Vayanos et al. ............... 370/352
2005/0063347 A1* 3/2005 Sarkkinen et al. ............ 370/338
2005/0073985 A1 4/2005 Heo et al.
2005/0180371 A1* 8/2005 Malkamaki ................... 370/342
2005/0185609 A1* 8/2005 Malkamaki ................... 370/328
2005/0201281 A1* 9/2005 Damnjanovic et al. ....... 370/230
2005/0207359 A1* 9/2005 Hwang et al. ................ 370/278
2005/0243831 A1 11/2005 Zhang et al.
2005/0276249 A1* 12/2005 Damnjanovic et al. ....... 370/335
2006/0092972 A1* 5/2006 Petrovic et al. ............... 370/469
2006/0221923 A1 10/2006 Usuda et al.
2006/0252452 A1 11/2006 Umesh et al.
2006/0256806 A1 11/2006 Usuda et al.
2006/0258364 A1 11/2006 Usuda et al.
2007/0047487 A1 3/2007 Usuda et al.
2007/0206623 A1* 9/2007 Tiedemann et al. .......... 370/431

FOREIGN PATENT DOCUMENTS

KR 1998-045411 9/1998
WO 01/31956 5/2001
WO 03/100989 12/2003

OTHER PUBLICATIONS

3GPP2 C.20003-C, "Medium Access Control (MAC) Standard for cdma2000 Spread Spectrum Systems", 3rd Generation Partnership Project 2 "3GPP2", Version 2.0, Release C, Aug. 2004.
3GPP2 C.S0004-C, "Signaling Link Access Control (LAC) Standard for cdma2000 Spread Spectrum Systems", 3rd Generation Partnership Project 2 "3GPP2", Version 2.0, Revision C, Jul. 23, 2004.
3GPP2 C.S0005-C, "Upper Layer (Layer 3) Signaling Standard for cdma2000 Spread Spectrum Systems", 3rd Generation Partnership Project 2 "3GPP2", Version 2.0, Revision c, Jul. 23, 2004.
3GPP TS 25.309 V6.2.0 (Mar. 2005), 3rd Generation Partnership Project; Technical Specification Group Radio Access Network; FDD Enhanced Uplink; Overall Description; Stage 2, (Release 6).
3GPP TS 25.308 V6.1.0 (Mar. 2004), 3rd Generation Partnership Project; Technical Specification Group Access Network; High Speed Downlink Packet Access (HSDPA); Overall Description; Stage 2, (Release 6).
3GPP TS 25.308 V6.3.0 (Dec. 2004), 3rd Generation Partnership Project; Technical Specification Group Radio Access Network; High Speed Downlink Packet Access (HSDPA); Overall Description; Stage 2, (Release 6).
3GPP TS 25.321 V6.1.0 (Mar. 2004), 3rd Generation Partnership Project; Technical Specification Group Radio Access Network; Medium Access Control (MAC) Protocol Specification, (Release 6).
3GPP TS 25.321 V6.4.0 (Mar. 2005), 3rd Generation Partnership Project; Technical Specification Group Radio Access Network; Medium Access Control (MAC) Protocol Specification (Release 6).
3GPP TR 25896 V6.0.0 (Mar. 2004), 3rd Generation Partnership Project; Technical Specification Group Radio Access Network; Feasibility Study for Enhanced Uplink for UTRA FDD (Release 6).
3GPP2 C.S0002-C, "Physical Layer Standard for cdma2000 Spread Spectrum Systems", 3rd Generation Partnership Project 2 "3GPP2", Version 2.0, Release C, Jul. 23, 2004.
3GPP2 C.S0004-C, "Signaling Link Access Control (LAC) Standard for cdma2000 Spread Spectrum Systems", 3rd Generation Partnership Project 2 "3GPP2", Version 2.0, Release C, Jul. 23, 2004.
3GPP2 C.S0005-C, "Upper Layer (Layer 3) Signaling Standard for cdma2000 Spread Spectrum Systems", 3rd Generation Partnership Project 2 "3GPP2", Version 2.0, Release c, Jul. 23, 2004.
Nokia, "E-DCH L2/L# issues, MAC multiplexing," 3GPP TSG RAN WG 2 #41, R2-040470 (Feb. 16-20, 2004).
3GPP TR 25.896 V6.0.0 (Mar. 2004), 3rd Generation Partnership Project; Technical Specification Group Radio Access Network; Feasibility Study for Enhanced Uplink for UTRA FDD (Release 6).
Interdigital and Panasonic, "Text Proposal on Enhanced Uplink MAC Architecture for TS 25.309," 3GPP2 TSG RAN WG2 #43, R2-042042 (Oct. 4-8, 2004).
Interdigital et al., "Text Proposal on Enhanced Uplink MAC Architecture for TS 25.309," 3GPP TSG RAN WG2 #43 , R2-042250 (Oct. 4-8, 2004).
3GPP TS 25.309 V6.2.0 (Mar. 2005), 3rd Generation Partnership Project; Technical Specification Group Radio Access Network; FDD Enhanced Uplink; Overall Descripton; Stage 2, (Release 6).
3GPP TS 25.308 V6.1.0 (Mar. 2004), 3rd Generation Partnership Project; Technical Specification Group Access Network; High Speed Downlink Packet Access (HSDPA); Overall Description; Stage 2 (Release 6).
3GPP TS 25.308 V6.3.0 (Dec. 2004), 3rd Generation Partnership Project; Technical Specification Group Radio Access Network; High Speed Downlink Packet Access (HSDPA); Overall Description; Stage 2 (Release 6).
3GPP TS 25.321 V6.4.0 (Mar. 2005), 3rd Generation Partnership Project; Technical Specification Group Radio Access Networks; Medium Access Control (MAC) Protocol Specification (Release 6).
3rd Generation Partnership Project; Technical Specification Group Radio Access Network; Radio Resource Control (RRC) protocol specification (Release 1999), 3GPP TS 25.331 V3.18.0 (Mar. 2004).
3rd Generation Partnership Project; Technical Specification Group Radio Access Network; Radio Resource Control (RRC) protocol specification (Release 4), 3GPP TS 25.331 V4.13.0 (Mar. 2004).
3rd Generation Partnership Project; Technical Specification Group Radio Access Network; Radio Resource Control (RRC) protocol specification (Release 4), 3GPP TS 25.331 V4.17.0 (Mar. 2005).
3rd Generation Partnership Project; Technical Specification Group Radio Access Network; Radio Resource Control (RRC) protocol specification (Release 5), 3GPP TS 25.331 V5.8.0 (Mar. 2004).
3rd Generation Partnership Project; Technical Specification Group Radio Access Network; Radio Resource Control (RRC) protocol specification (Release 5), 3GPP TS 25.331 V5.12.1 (Mar. 2005).
3rd Generation Partnership Project; Technical Specification Group Radio Access Network; Radio Resource Control (RRC) protocol specification (Release 6), 3GPP TS 25.331 V6.1.0 (Mar. 2004).
3rd Generation Partnership Project; Technical Specification Group Radio Access Network; Radio Resource Control (RRC) protocol specification (Release 6), 3GPP TS 25.331 V6.5.0 (Mar. 2005).
3rd Generation Partnership Project; Technical Specification Group Radio Access Network; UTRAN overall decription (Release 5), 3GPP TS 25.401 V5.7.0 (Dec. 2003).
3GPP2 C.S0003-C, "Medium Access Control (MAC) Standard for cdma2000 Spread Spectrum Systems", 3rd Generation Partnership Project 2 "3GPP2", Version 2.0, Release C, Aug. 2004.
3rd Generation Partnership Project; Technical Specification Group Radio Access Network; Radio Resource Control (RRC) protocol specification (Release 1999), 3GPP TS 25.311 V3.18.0 (Mar. 2004).
3rd Generation Partnership Project; Technical Specification Group Radio Access Network; Radio Resource Control (RRC); Protocol Specification (Release 5), 3GPP TS 25.331 V5.8.0 (Mar. 2004).
3rd Generation Partnership Project; Technical Specification Group Radio Access Network; Radio Resource Control (RRC); Protocol Specification (Release 5), 3GPP TS 25.331 V5.12.1 (Mar. 2005).
3rd Generation Partnership Project; Technical Specification Group Radio Access Network; Radio Resource Control (RRC); Protocol Specification (Release 6), 3GPP TS 25.331 V6.1.0 (Mar. 2004).
3rd Generation Partnership Project; Technical Specification Group Radio Access Network; Radio Resource Control (RRC); Protocol Specification (Release 6), 3GPP TS 25.331 V6.5.0 (Mar. 2005).
Interdigital and Panasonic, "Text Proposal on Enhanced Uplink MAC Architecture for TS 25.309," 3GPP TSG RAN WG2 #43, R2-042042 (Oct. 4-8, 2004).
Interdigital et al., "Text Proposal on Enhanced Uplink MAC Architecture for TS 25.309," 3GPP TSG RAN WG2 #43, R2-042250 (Oct. 4-8, 2004).
Motorola, "MAC-e/es architecture for UTRAN and UE," TSG RAN WG2 #44, R2-041994 (Oct. 4-8, 2004).

Third Generation Partnership Project, "Technical Specification Group Radio Access Network; High Speed Downlink Packet Access (HSDPA); Overall Description; Stage 2 (Release 5)," 3GPP TS 25.308 V5.7.0 (Dec. 2004).
3GPP TR 25.896 V6.0.0 (Mar. 2004), 3rd Generation Partnership Project; Technical Specification Group Radio Access Network; Feasibility Study for Enhanced Uplink For UTRA FDD (Release 6).
3GPP TS 25.308 V6.1.0 (Mar. 2004), 3rd Generation Partnership Project; Technical Specification Group Access Network; High Speed Downlink Packet Access (HSDPA); Overall Description; Stage 2, (Release 6).
3GPP TS 25.308 V6.3.0 (Dec. 2004), 3rd Generation Partnership Project; Technical Specification Group Radio Access Network; High Speed Downlink Packet Access (HSDPA); Overall Description; Stage 2, (Release 6).
3GPP TS 25.309 V6.2.0 (Mar. 2005), 3rd Generation Partnership Project; Technical Specification Group Radio Access Network; FDD Enhanced Uplink; Overall Description; Stage 2, (Release 6).
3GPP TS 25.321 V6.1.0 (Mar. 2004), 3rd Generation Partnership Project; Technical Specification Group Radio Access Network; Medium Access Control (MAC) Protocol Specification, (Release 6).
3GPP TS 25.321 V6.4.0 (Mar. 2005), 3rd Generation Partnership Project; Technical Specification Group Radio Access Network; Medium Access Control (MAC) Protocol Specification (Release 6).
3GPP2 C.S0002-C, "Physical Layer Standard for cdma2000 Spread Spectrum Systems", 3rd Generation Partnership Project 2 "3GPP2", Version 2.0, Revision C, Jul. 23, 2004.
3GPP2 C.S0003-C, "Medium Access Control (MAC) Standard for cdma2000 Spread Spectrum Systems", 3rd Generation Partnership Project 2"3GPP2", Version 2.0, Release C, Aug. 2004.
3GPP2 C.S0004-C, "Signaling Link Access Control (LAC) Standard for cdma2000 Spread Spectrum Systems", 3rd Generation Partnership Project 2 "3GPP2", Version 2.0, Revision C, Jul. 23, 2004.
3GPP2 C.S0005-C, "Upper Layer (Layer 3) Signaling Standard for cdma2000 Spread Spectrum Systems", 3rd Generation Partnership Project 2 "3GPP2", Version 2.0, Revision C, Jul. 23, 2004.
3rd Generation Partnership Project; Technical Specification Group Radio Access Network; UTRAN overall description (Release 5), 3GPP TS 25.401 V5.7.0 (Dec. 2003).
3rd Generation Partnership Project; Technical Specification Group Radio Access Network; Radio Resource Control (RRC) protocol specification (Release 1999), 3GPP TS 25.331 V3.18.0 (Mar. 2003).
3rd Generation Partnership Project; Technical Specification Group Radio Access Network; Radio Resource Control (RRC) protocol specification (Release 1999), 3GPP TS 25.331 V3.21.0 (Dec. 2004).
3rd Generation Partnership Project; Technical Specification Group Radio Access Network; Radio Resource Control (RRC); Protocol Specification (Release 4), 3GPP TS 25.331 V4.13.0 (Mar. 2004).
3rd Generation Partnership Project; Technical Specification Group Radio Access Network; Radio Resource Control (RRC); Protocol Specification (Release 4), 3GPP TS 25.331 V4.17.0 (Mar. 2005).
3rd Generation Partnership Project; Technical Specification Group Radio Access Network; Radio Resource Control (RRC); Protocol Specification (Release 5), 3GPPS TS 25.331 V5.8.0 (Mar. 2004).
3rd Generation Partnership Project; Technical Specification Group Radio Access Network; Radio Resource Control (RCC); Protocol Specification (Release 5), 3GPP TS 25.331 V5.12.1 (Mar. 2005).
3rd Generation Partnership Project; Technical Specification Group Radio Access Network; Radio Resource Control (RCC); Protocol Specification (Release 5), 3GPP TS 25.331V6.1.0 (Mar. 2004).
3rd Generation Partnership Project; Technical Specification Group Radio Access Network; Radio Resource Control (RCC); Protocol Specification (Release 5), 3GPP TS 25.331 V6.5.0 (Mar. 2005).
3rd Generation Partnership Project; Technical Specification Group Radio Access Network; UTRAN Overall Description (Release 1999), 3GPP TS 25.401 V3.10.0 (Jun. 2002).
3rd Generation Partnership Project; Technical Specification Group Radio Access Network; UTRAN overall description (Release 4), 3GPP TS 25.401 V4.6.0 (Dec. 2002).
3rd Generation Partnership Project; Technical Specification Group Radio Access Network; UTRAN overall description (Release 5), 3GPP TS 25.401 V5.9.0 (Sep. 2004).
3rd Generation Partnership Project; Technical Specification Group Radio Access Network; UTRAN overall description (Release 6), 3GPP TS 25.401 V6.2.0 (Dec. 2003).
3rd Generation Partnership Project; Technical Specification Group Radio Access Network; UTRAN overall description (Release 6), 3GPP TS 25.401 V6.5.0 (Dec. 2004).
Interdigital and Panasonic, "Text Proposal on Enhanced Uplink MAC Architecture for TS 25.309," 3GPP TSG RAN WG2#43, R2-042042 (Oct. 4-8, 2004).
Interdigital et al., "Text Proposal on Enhanced Uplink MAC Architecture for TS 25.309," 3GPP TSG RAN WG2#43, R2-042250 (Oct. 4-8, 2004).
Interdigital, "Text Proposal on Enhanced Uplink MAC Architecture for TS 25.309," 3GPP TSG RAN WG2 R6 AdHoc, R2-041276 (Jun. 21-24, 2004).
LG Electronics, "Further issues on L2/L3 protocols in E-DCH," TSG RAN WG2 #41, R2-040418 (Feb. 16-20, 2004).
Motorola, " MAC-e/es architecture for UTRAN and UE," TSG RAN WG2 #44, R2-041994 (Oct. 4-8, 2004).
Nokia, "E-DCH L2/L3 issues, MAC multiplexing," 3GPP TSG RAN WG 2 #41, R2-040470 (Feb. 16-20, 2004).
Nokia, "E-DCH L2/L3 issues, Text proposal for TR 25.896 Chapter 11 'Impacts on L2/L3 protocols,'" 3GPP TSG-RAN WG2#40, R2-040019 (Jan. 12-16, 2004).
Panasonic, "HSUPA MAC architecture," 3GPP TSG RAN WG2 #42, R2-040973 (May 10-14, 2004).
Qiu et al., "An Enhanced RLC/MAC Design for Supporting Integrated Services over EGPRS," Wireless Communications and Networking Conference, 2000. WCNC. 2000 IEEE, pp. 907-912 (2000).
Third Generation Partnership Project, "Technical Specification Group Radio Access Network; High Speed Downlink Packet Access (HSDPA); Overall Description; Stage 2 (Release 5)," 3GPP TS 25.308 V5.5.0 (Mar. 2004).
Third Generation Partnership Project, "Technical Specification Group Radio Access Network; High Speed Downlink Access Packet Access (HSDPA); Overall Description; Stage 2 (Release 5)," 3GPP TS 25.308 V5.7.0 (Dec. 2004).
Third Generation Partnership Project, "Technical Specification Group Radio Access Network; MAC Protocol Specification (Release 1999)," 3GPP TS 25.321 v3.16.0 (Mar. 2003).
Third Generation Partnership Project, "Technical Specification Group Radio Access Network; MAC Protocol Specification (Release 1999)," 3GPP TS 25.321 v3.17.0 (Jun. 2004).
Third Generation Partnership Project, "Technical Specification Group Radio Access Network; MAC Protocol Specification (Release 4)," 3GPP TS 25.321 v4.9.0 (Sep. 2003).
Third Generation Partnership Project, "Technical Specification Group Radio Access Network; MAC Protocol Specification (Release 4)," 3GPP TS 25.321 v4.10.0 (Jun. 2004).
Third Generation Partnership Project, "Technical Specification Group Radio Access Network; MAC Protocol Specification (Release 5)," 3GPP TS 25.321 v5.8.0 (Mar. 2004).
Third Generation Partnership Project, "Technical Specification Group Radio Access Network; MAC Protocol Specification (Release 5)," 3GPP TS 25.321 v5.10.0 (Dec. 2004).
Third Generation Partnership Project, "Technical Specification Group Radio Access Network; Feasibility Study for enhanced Uplink for UTRA FDD (Release 6)," 3GPP TR 25.896 V2.0.0 (Mar. 2004).

* cited by examiner

MEDIUM ACCESS CONTROL LAYER ARCHITECTURE FOR SUPPORTING ENHANCED UPLINK

CROSS REFERENCE TO RELATED APPLICATIONS

This application claims the benefit of U.S. Provisional Application Nos. 60/568,944 filed May 7, 2004 and 60/578,533 filed Jun. 10, 2004, which are incorporated by reference as if fully set forth.

FIELD OF INVENTION

The present invention is related to a wireless communication system including a wireless transmit/receive unit (WTRU) and a Node-B. More particularly, the invention is related to medium access control (MAC) layer architecture and functionality for supporting enhanced uplink (EU) in the wireless communication system.

BACKGROUND

Methods for improving uplink (UL) coverage, throughput and transmission latency are being investigated in Release 6 of the Third Generation Partnership Project (3GPP). In order to successfully implement these methods, scheduling and assigning of UL physical resources have been moved from a radio network controller (RNC) to the Node-B such that the Node-B can make decisions and manage UL radio resources on a short-term basis more efficiently than the RNC, even if the RNC retains overall control of the Node-B.

One or more independent UL transmissions are processed on the enhanced dedicated channel (E-DCH) between the WTRU and a universal mobile telecommunication systems (UMTS) terrestrial radio access network (UTRAN) within a common time interval. One example of this is a MAC layer hybrid-automatic repeat request (H-ARQ) or a simple MAC layer ARQ operation where each individual transmission may require a different number of retransmissions to be successfully received by the UTRAN.

SUMMARY

The present invention is related to an improved MAC layer architecture and functionality for supporting EU. A new MAC entity for EU called a MAC-e entity is defined and incorporated into a WTRU, a Node-B and an RNC. The WTRU MAC-e handles H-ARQ transmissions and retransmissions, priority handling, MAC-e multiplexing, and transport format combination (TFC) selection. The Node-B MAC-e entity handles H-ARQ transmissions and retransmissions, enhanced dedicated channel (E-DCH) scheduling and MAC-e demultiplexing. The RNC MAC-e entity provides in-sequence delivery and handles combining of data from different Node-Bs.

The WTRU MAC-e comprises an EU rate request/assignment entity, a priority handling entity, a TFC selection entity and an H-ARQ entity. The EU rate request/assignment entity sends a rate request to a Node-B for transmitting a data via E-DCH and for processing a rate grant received from the Node-B. The priority handling entity manages assignment of the data and an H-ARQ process in accordance with priority of the data to be transmitted. The TFC selection entity selects a TFC for the data. The H-ARQ entity retransmits the data in accordance with a transmission feedback from the Node-B. The Node-B MAC-e comprises a scheduler, a demultiplexer and an H-ARQ entity.

BRIEF DESCRIPTION OF THE DRAWINGS

A more detailed understanding of the invention may be had from the following description of a preferred embodiment, given by way of example and to be understood in conjunction with the accompanying drawing wherein.

DETAILED DESCRIPTION OF THE PREFERRED EMBODIMENTS

Hereafter, the terminology "WTRU" includes but is not limited to a user equipment, a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The features of the present invention may be incorporated into an integrated circuit (IC) or be configured in a circuit comprising a multitude of interconnecting components.

Figure 1:
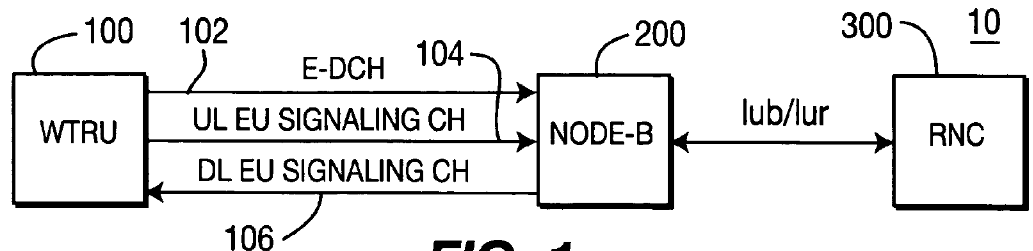
FIG. 1 is a block diagram of a wireless communication system in accordance with the present invention.

FIG. 1 is a block diagram of a wireless communication system 10 in accordance with the present invention. The system 10 comprises a WTRU 100, a Node-B 200 and an RNC 300. The RNC 300 controls overall EU operation by configuring EU parameters for the Node-B 200 and the WTRU 100 such as initial transmit power level, maximum allowed EU transmit power or available channel resources per Node-B. Between the WTRU 100 and the Node-B 200, an E-DCH 102 is established for supporting EU transmissions.

For E-DCH transmissions, the WTRU 100 sends a rate request to the Node-B 200 via an UL EU signaling channel 104. In response, the Node-B 200 sends a rate grant to the WTRU 100 via a downlink (DL) EU signaling channel 106. After EU radio resources are allocated for the WTRU 100, the WTRU 100 transmits E-DCH data via the E-DCH 102. In response to the E-DCH transmissions, the Node-B sends an acknowledge (ACK) or non-acknowledge (NACK) for H-ARQ operation via the DL EU signaling channel 106. The Node-B 200 may also respond with rate grants to the WTRU 100 in response to E-DCH data transmissions.

Figure 2:
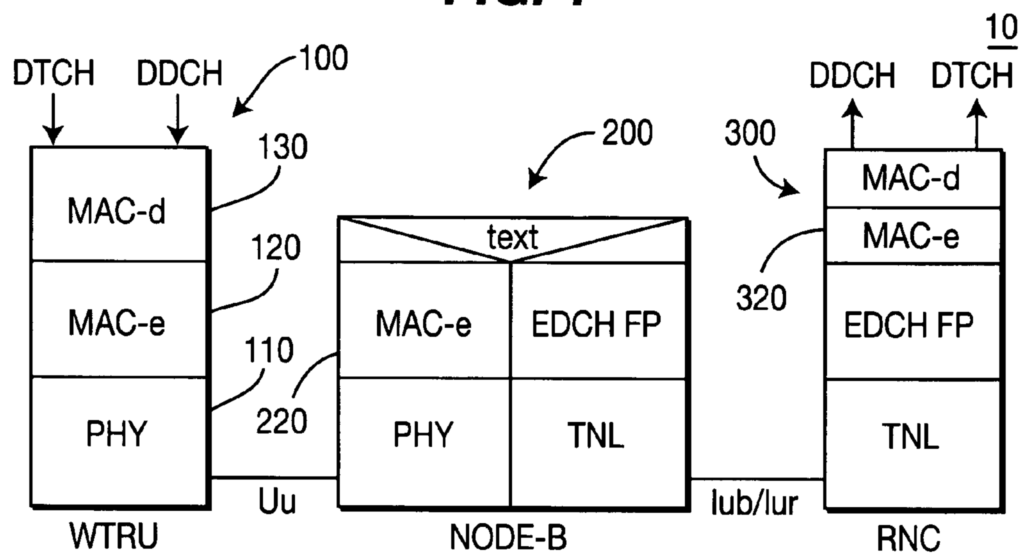
FIG. 2 is a block diagram of a protocol architecture of a WTRU in accordance with the present invention.

FIG. 2 is a block diagram of protocol architecture of the E-DCH 102 in accordance with the present invention. A new MAC entity for EU called MAC-e is created in the WTRU 100, the Node-B 200 and the RNC 300 to handle all functions related to the transmission and reception of an E-DCH. A MAC-e entity 120 is incorporated into the WTRU 100 between a MAC-d entity 130 and a physical layer (PHY) entity 110. The MAC-e 120 in the WTRU handles H-ARQ transmissions and retransmissions, priority handling, MAC-e multiplexing, and TFC selection. A MAC-e 220 entity is incorporated into the Node-B 200 which handles H-ARQ transmissions and retransmissions, E-DCH scheduling and MAC-e demultiplexing. A MAC-e entity 320 is incorporated into the RNC 300 to provide in-sequence delivery and to handle combining of data from different Node-Bs.

Figure 3:
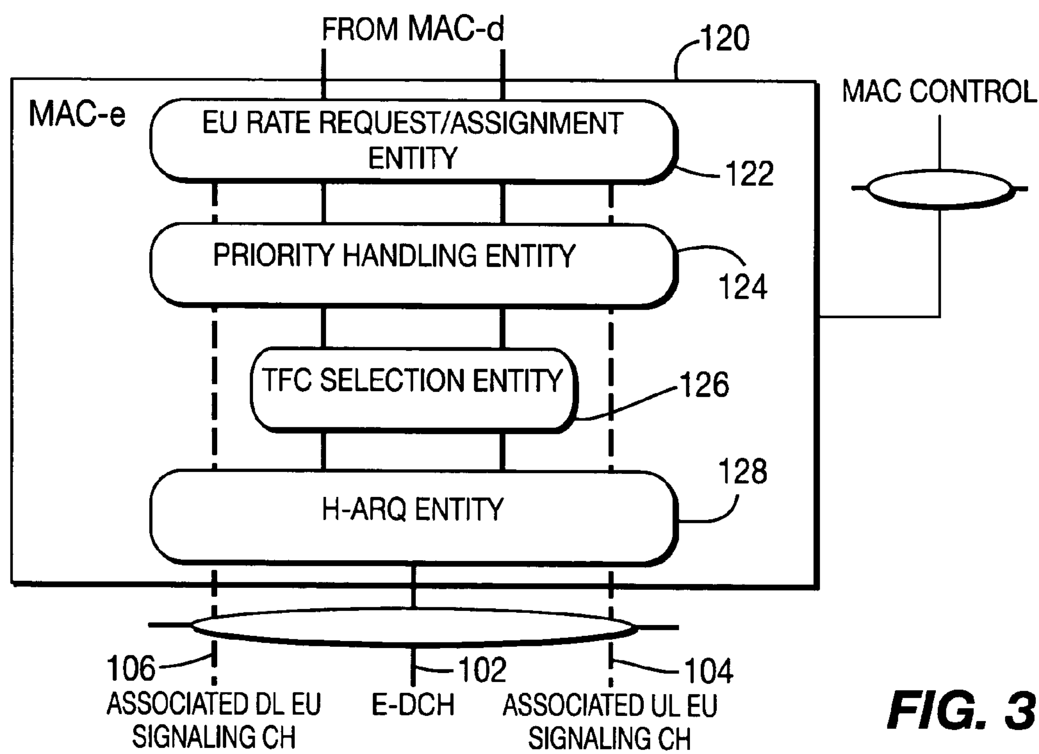
FIG. 3 is a block diagram of MAC-e architecture in a WTRU in accordance with the present invention.

FIG. 3 is a block diagram of the MAC-e 120 architecture in a WTRU 100 in accordance with the present invention. The WTRU MAC-e 120 comprises an EU rate request/assignment entity 122, a priority handling entity 124, a TFC selection entity 126 and an H-ARQ entity 128. It should be noted that FIG. 3 is provided as an example of preferred embodiment of the present invention and that the entities shown in FIG. 3 may be incorporated into a common MAC functional entity and that the functions may be implemented by more or less functional entities.

The EU rate request/assignment entity 122 is responsible for requesting radio resources from the Node-B 200 when the WTRU 100 has E-DCH data waiting to be transmitted via the E-DCH 102. The EU rate request could be one of a traffic volume indicator, a requested data rate, a TFC index, and traffic volume measurement (TVM) quantities for each data flow. The rate request can be sent to the Node-B 200 via either physical or MAC layer signaling. Rate requests are generated based on radio link control (RLC) data TVM. The TVM may include traffic volume of data for E-DCH transmissions or optionally may further include data awaiting retransmission with active H-ARQ processes.

When the WTRU 100 receives a rate grant, (i.e., rate and/or time scheduling), from the Node-Bs 200, (the WTRU may receive the rate grant from more than one Node-B), the EU rate request/assignment entity 122 notifies the priority handling entity 124 that resources are available for transmission of the data. The received rate grants determine the E-DCH transport format combination set (TFCS) subset, and/or start time, and duration (optional).

By sending the rate request, the WTRU 100 may ask the Node-B 200 to change the set of allowed UL TFCs within the TFCS, and the Node-B 200 can change the allowed UL TFCs within the TFCS by sending the rate grant. The WTRU 100 may send a scheduling information update to the Node-B 200 to provide buffer occupancy and/or available transmit power information so that a scheduling entity 222 in the Node-B 200 may determine appropriate TFCS indicator and transmission time interval. For fast rate scheduling by persistency control, the Node-B 200 may send parameters that represent the available interference the system can tolerate and thus prevent WTRUs in rate control mode from introducing additional interference. One way this can be accomplished is for the Node-B 200 to signal the allowed transmit power the WTRU 100 may use for EU transmissions in the rate grant.

The priority handling entity 124 manages the assignment of data flows and H-ARQ processes according to the priority of the data. Based on transmission feedback from associated DL EU signaling, either a new transmission or retransmission is determined. Furthermore, a queue identity (ID) and transmission sequence number (TSN) for each MAC protocol data unit (PDU) is determined. The TSN is unique to each priority class within an E-DCH, and is incremented for each new data block. Optionally, the priority handling entity 124 may preempt retransmission of lower priority data. A new transmission of higher priority data can be initiated instead of a pending retransmission of lower priority data at any time to support priority handling.

The TFC selection entity 126 selects a TFC for the data to be transmitted on the E-DCH 102 according to the information signaled in the rate grants, and multiplexes multiple MAC-d flows into one MAC-e PDU. The rate grant may be either absolute grant or relative grant. The absolute grant provides an absolute limitation of the maximum amount of UL resources that the WTRU may use. The relative grant increases or decreases the resource limitation compared to the previously used value.

The TFC selection is subject to maximum allowed transmit power, and the corresponding TFCS subset allowed by the rate grants from the Node-B 200. TFC selection is based on logical channel priorities such that the TFC selection maximizes the transmission of higher priority data. The allowed combinations of MAC-d flows in one MAC-e PDU, which is configured by the RNC, are also considered in selecting the TFC.

The H-ARQ entity 128 handles all the tasks that are required for H-ARQ protocols. The H-ARQ entity 128 is responsible for storing MAC-e payloads and retransmitting them in the case of a failed transmission. The H-ARQ entity 128 may support multiple instances, (H-ARQ processes), of the H-ARQ protocol. There may be more than one H-ARQ process for the EU configured at the WTRU 100.

In accordance with the present invention, a synchronous H-ARQ is preferably implemented. Therefore, H-ARQ operation is based on synchronous DL ACK and NACK and synchronous retransmissions in the UL.

Figure 4:
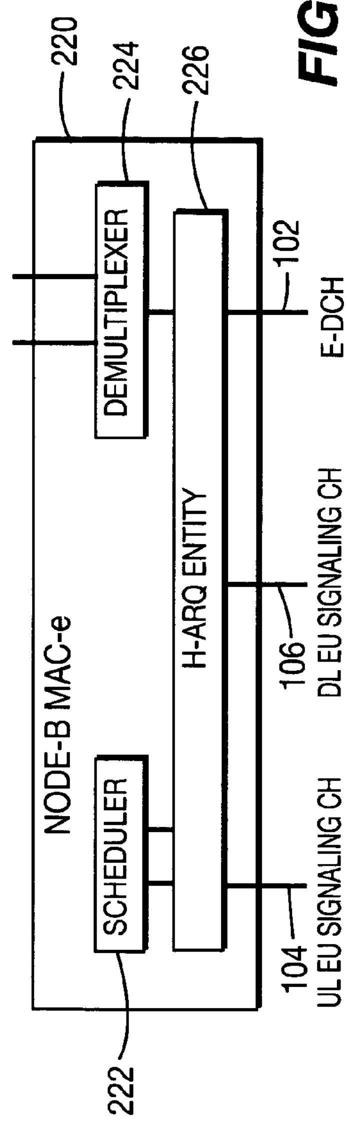
FIG. 4 is a block diagram of MAC-e architecture in a Node-B in accordance with the present invention.

FIG. 4 is a block diagram of MAC-e 220 architecture in a Node-B 200 in accordance with the present invention. The Node-B MAC-e 220 comprises a scheduler 222, a demultiplexer 224 and an H-ARQ entity 226. In the Node-B, one MAC-e entity 220 is preferably provided for each WTRU and one scheduler is preferably provided for each cell. The scheduler 222 manages E-DCH cell resources between WTRUs.

The scheduler 222 manages E-DCH resources between WTRUs and H-ARQ processes. Based on rate requests from WTRUs 100, the scheduler 222 generates rate grants and sends them to the WTRUs 100 via DL EU signaling channels 106. The rate grant provides information that determines the set of TFCs from which the WTRU 100 may choose and indicates the maximum resource that a WTRU is allowed to use for E-DCH transmissions. The scheduler 222 controls reception of rate request and transmission of rate grants on a corresponding EU signaling channel. Alternatively, a separate control entity (not shown) may be provided in the Node-B MAC-e 220 for reception of the rate requests and transmission of rate grants and the scheduler 222 may be provided out of the Node-B MAC-e 220.

The demultiplexer 224 demultiplexes MAC-e PDUs into MAC-d PDUs. MAC-d flow to MAC-e PDU multiplexing is supported in the WTRU 100. Multiple MAC-d flows can be configured for one WTRU and can be multiplexed in the same MAC-e PDU. The combination of MAC-d flows that can be multiplexed in one MAC-e PDU is configured by the RNC 300. The multiplexed MAC-e PDUs are demultiplexed into MAC-d flows by the demultiplexer 224. The Node-B demultiplexing may result in MAC-d or RLC PDU reordering, and MAC-e PDU reordering may be performed by the RNC 300.

Reordering may be performed either in the Node-B MAC-e where the H-ARQ process number is known, or in the RNC MAC-e. Referring back to FIG. 2, the RNC MAC-e 320 includes a reordering entity for reordering received MAC-e PDUs according to the received transmission sequence number (TSN). MAC-e PDUs with consecutive TSNs are delivered to the disassembly function and PDUs with a missing lower TSN are not delivered to the disassembly function. The disassembly function removes the MAC-e header before sending it to a higher layer. The RNC 300 includes a plurality of reordering queues for reordering PDUs with different priority classes.

In the case that the reordering is performed in the RNC MAC-e, the Node-B 200 passes the H-ARQ process number with the successfully decoded data to the RNC 300. The H-ARQ process may also be implicitly known by the time of reception at Node-B passed to the RNC. The H-ARQ process number may be implicitly derived from either a system frame number (SFN) or a connection frame number (CFN) along with the knowledge of the H-ARQ process allocation scheme in the WTRU 100.

The H-ARQ entity 226 generates ACKs and NACKs indicating the delivery status of E-DCH transmissions. One H-ARQ entity may support multiple instances of stop and wait H-ARQ protocols.

Figure 5:
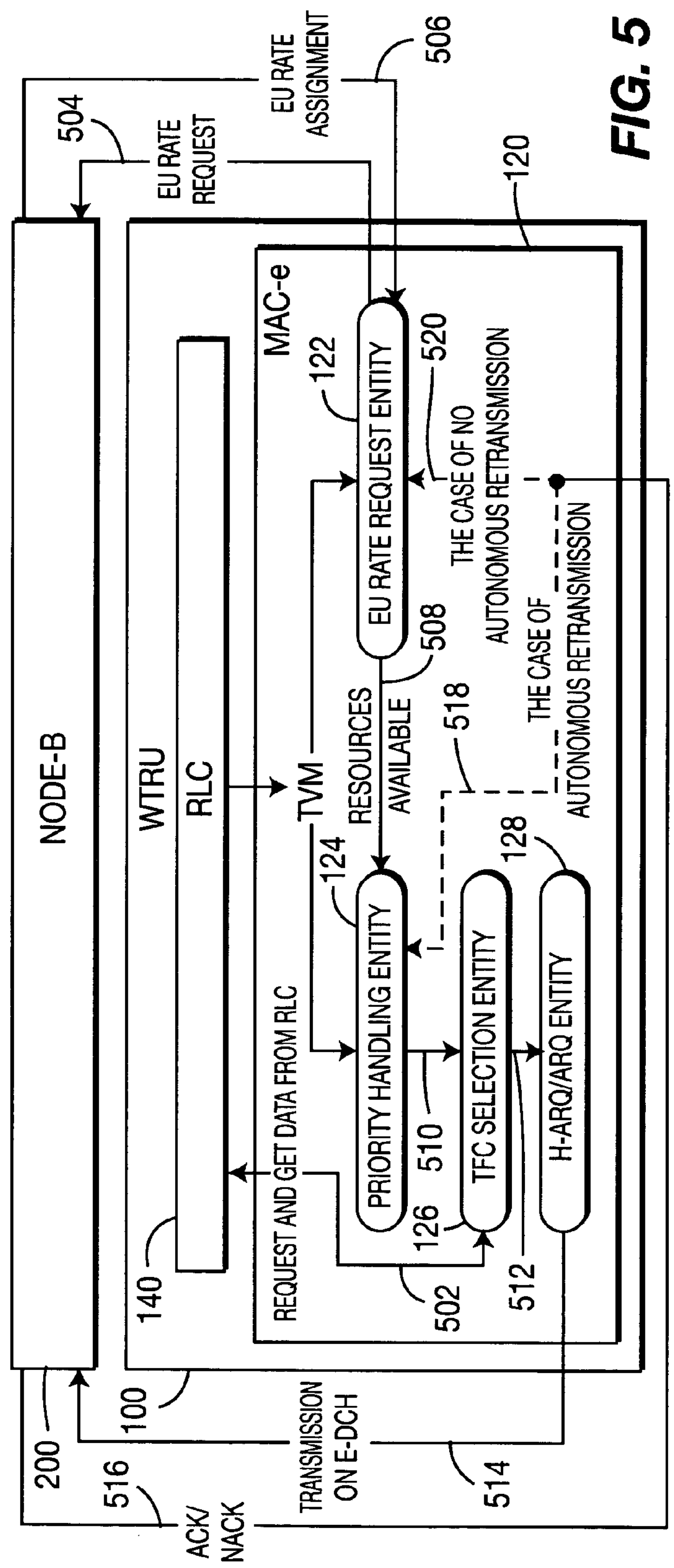
FIG. 5 is a block diagram of MAC-e architecture of a WTRU and a Node-B along with signaling process between the WTRU and the Node-B in accordance with the present invention.

FIG. 5 is a block diagram of MAC-e architecture of a WTRU 100 and a Node-B 200 along with signaling processes between the WTRU 100 and the Node-B 200 in accordance with the present invention. When the WTRU MAC-e 120 receives data from WTRU RLC layer 140 to be transmitted via an E-DCH 102 at step 502, the EU rate request entity 122 sends a rate request to the Node-B 200 (step 504). The Node-B 200 responds with a rate grant (step 506). Upon receipt of the rate grant, the EU rate request entity 122 notifies the priority handling unit 124 that radio resources are available for transmission of the data (step 508). The priority handling unit 124 then multiplexes data and assigns an H-ARQ process according to the priority of the data, and a TFC for the data is selected by the TFC selection entity (steps 510, 512). The data is transmitted with the assigned H-ARQ process via the E-DCH 102 (step 514). The Node-B 200 sends a feedback signal through DL EU signaling channel 106 (step 516). If the feedback is a NACK, the data may be autonomously retransmitted (step 518), or may be retransmitted after another rate grant is received (step 520).

Although the features and elements of the present invention are described in the preferred embodiments in particular combinations, each feature or element can be used alone without the other features and elements of the preferred embodiments or in various combinations with or without other features and elements of the present invention.

While the present invention has been described in terms of the preferred embodiment, other variations which are within the scope of the invention as outlined in the claims below will be apparent to those skilled in the art.

What is claimed is:

1. A medium access control entity for enhanced uplink (MAC-e) in a wireless transmit/receive unit (WTRU), comprising:

circuitry configured to transmit information regarding a volume of enhanced dedicated channel (E-DCH) data;

circuitry configured to receive grant information in response to the transmitted information;

circuitry configured to receive information from a radio access network indicating allowed combinations of medium access control for dedicated channel (MAC-d) flows that are allowed to be multiplexed into a MAC-e protocol data unit (PDU);

in response to the received information indicating allowed combinations of MAC-d flows, circuitry configured to multiplex MAC-d flows into a MAC-e PDU based on the allowed combinations of MAC-d flows;

circuitry configured to select a transport format combination (TFC) for transmission of the MAC-e PDU based on the received gant information; and a hybrid automatic repeat request (H-ARQ) entity configured to retransmit the MAC-e PDU in accordance with a transmission feedback.

2. The MAC-e of claim 1 wherein the information regarding a volume of E-DCH data indicates a request for uplink resources.

3. The MAC-e of claim 1 wherein the information regarding a volume of E-DCH data is transmitted via physical layer signaling.

4. The MAC-e of claim 1 wherein the information regarding a volume of E-DCH data is transmitted via medium access control (MAC) layer signaling.

5. The MAC-e of claim 1 wherein the grant information indicates an allowed transmit power.

6. The MAC-e of claim 1 wherein the radio access network includes a radio network controller (RNC).

7. The MAC-e of claim 1 wherein retransmission of the MAC-e PDU which is not successfully delivered is initiated autonomously without receiving further grant information.

8. The MAC-e of claim 1 wherein retransmission of the MAC-e PDU which is not successfully delivered is not autonomously retransmitted, wherein further grant information is received before retransmitting the MAC-e PDU.

9. The MAC-e of claim 1 wherein the grant information is an absolute grant, which provides an absolute limitation of the maximum amount of uplink (UL) resources that the WTRU may use.

10. The MAC-e of claim 1 wherein the grant information is a relative grant, wherein the relative grant specifies an amount by which a current amount of uplink resources is increased or decreased.

11. A method for processing data in a medium access control entity for enhanced uplink (MAC-e) implemented in a wireless transmit/receive unit (WTRU), comprising:

receiving data for transmission, wherein the data is for transmission over an enhanced dedicated channel (E-DCH);

transmitting information regarding a volume of the E-DCH data;

receiving grant information in response to the transmitted information;

receiving information from a radio access network indicating allowed combinations of medium access control for dedicated channel (MAC-d) flows that are allowed to be multiplexed into a MAC-e protocol data unit (PDU);

in response to the received information indicating allowed combinations of MAC-flows, multiplexing MAC-d flows into a MAC-e PDU based on the allowed combinations of MAC-d flows;

selecting a transport format combination (TFC) for transmission of the MAC-e PDU based on the received grant information; and re-transmitting the MAC-e PDU in accordance with a transmission feedback.

12. The method of claim 11 wherein the information regarding a volume of E-DCH data indicates a request for uplink resources.

13. The method of claim 11 wherein the information regarding a volume of E-DCH data is transmitted via physical layer signaling.

14. The method of claim 11 wherein the information regarding a volume of E-DCH data is transmitted via medium access control (MAC) layer signaling.

15. The method of claim 11 wherein the grant information indicates an allowed transmit power.

16. The method of claim 11 wherein the radio access network includes a radio network controller (RNC).

17. The method of claim 11 wherein retransmission of the MAC-e PDU which is not successfully delivered is initiated autonomously without receiving further grant information.

18. The method of claim 11 wherein retransmission of the MAC-e PDU which is not successfully delivered is not autonomously retransmitted, wherein further grant information is received before retransmitting the MAC-e PDU.

19. The method of claim 11 wherein the grant information is an absolute grant, which provides an absolute limitation of the maximum amount of uplink (UL) resources that the WTRU may use.

20. The method of claim 11 wherein the grant information is a relative grant, wherein the relative grant specifies an amount by which a current amount of uplink resources is increased or decreased.

* * * * *

UNITED STATES PATENT AND TRADEMARK OFFICE

CERTIFICATE OF CORRECTION

PATENT NO. : 8,259,752 B2
APPLICATION NO. : 11/117626
DATED : September 4, 2012
INVENTOR(S) : Terry et al.

It is certified that error appears in the above-identified patent and that said Letters Patent is hereby corrected as shown below:

ON THE TITLE PAGE

Item (56) OTHER PUBLICATIONS, page 2, left column, on the sixty-sixth line, after "Nokia, "E-DCH", delete "L2/L#" and insert --L2/L3--.

Item (56) OTHER PUBLICATIONS, page 2, right column, on the second line, after "TS 25.309,"", delete "3GPP2" and insert --3GPP--.

Item (56) OTHER PUBLICATIONS, page 2, right column, on the fiftieth line, after "3GPP TS", delete "25.311" and insert --25.33--.

IN THE CLAIMS

At Claim 1, column 5, line 64, after "the received", delete "gant" and insert --grant--.

Signed and Sealed this
Ninth Day of April, 2013

Teresa Stanek Rea
*Acting Director of the United States Patent and Trademark Office*